United States Patent
Michelis et al.

(10) Patent No.: US 12,337,909 B2
(45) Date of Patent: Jun. 24, 2025

(54) METHOD FOR DETERMINING A SETPOINT TORQUE FOR A STEERING WHEEL AS A FUNCTION OF A GAIN DEPENDENT ON A STEERING WHEEL TORQUE

(71) Applicant: JTEKT EUROPE, Irigny (FR)

(72) Inventors: André Michelis, Chonas l'Amballan (FR); Pascal Moulaire, La Tour de Salvagny (FR); Christophe Ravier, Saint Pierre de Chandieu (FR); Pierre Larminy, Oullins (FR)

(73) Assignee: JTEKT EUROPE, Irigny (FR)

( * ) Notice: Subject to any disclaimer, the term of this patent is extended or adjusted under 35 U.S.C. 154(b) by 519 days.

(21) Appl. No.: 17/276,355

(22) PCT Filed: Aug. 21, 2019

(86) PCT No.: PCT/FR2019/051945
§ 371 (c)(1),
(2) Date: Mar. 15, 2021

(87) PCT Pub. No.: WO2020/065149
PCT Pub. Date: Apr. 2, 2020

(65) Prior Publication Data
US 2022/0041211 A1     Feb. 10, 2022

(30) Foreign Application Priority Data

Sep. 24, 2018  (FR) ..................... 18/58652

(51) Int. Cl.
*B62D 6/00*    (2006.01)
(52) U.S. Cl.
CPC .................. *B62D 6/008* (2013.01)

(58) Field of Classification Search
CPC ........ B62D 6/008; B62D 15/025; B62D 6/02; B62D 5/04; B62D 5/046; B62D 5/0463;
(Continued)

(56) References Cited

U.S. PATENT DOCUMENTS 6,843,538 B1 *  1/2005  Nagae ................ B60T 8/17554
                                                         303/146
8,666,606 B2 *  3/2014  Cassar .................. B62D 6/008
                                                         180/443
(Continued)

FOREIGN PATENT DOCUMENTS

CN      101332834 A  * 12/2008    ............ B62D 5/046
CN      107771146 A  *  3/2018    ........... B62D 5/0463
(Continued)

OTHER PUBLICATIONS

Tyler DeWitt, "What is a Weighted Average?", Oct. 23, 2012, Youtube.com (Year: 2012).*

(Continued)

*Primary Examiner* — Ramon A. Mercado
*Assistant Examiner* — Shaheda Hoque
(74) *Attorney, Agent, or Firm* — Oliff PLC

(57) ABSTRACT

A method for determining a setpoint torque for a steering wheel of an electric power steering system of a vehicle, the setpoint torque helping determine an engine torque applied directly or indirectly to the steering wheel, the setpoint torque being a function of at least one equivalent lateral acceleration having a dimension of an acceleration, wherein the equivalent lateral acceleration is weighted by a gain dependent on at least a steering wheel torque.

6 Claims, 2 Drawing Sheets

(58) Field of Classification Search
CPC ......... B62D 6/00; B60W 10/20; B60W 30/02;
B60W 2540/18; B60W 2710/202; B60W
2050/0037; B60W 2520/10; B60W
2520/105; B60W 2510/20; B60W
2520/26; B60W 2710/20; B60W 2552/40;
B60W 2540/10; B60W 2540/12; B60W
30/045; B60W 40/12; B60W 40/109;
B60T 2260/02; B60K 26/021; B60K
2026/023

See application file for complete search history.

(56) References Cited

U.S. PATENT DOCUMENTS

| | | | | |
|---|---|---|---|---|
| 2010/0250068 A1* | 9/2010 | Yamazaki | ................ | B62D 6/02 701/41 |
| 2011/0259663 A1* | 10/2011 | Goutsu | ................ | B62D 6/002 701/41 |
| 2012/0203397 A1* | 8/2012 | Michelis | ................ | B62D 6/008 701/1 |
| 2012/0259513 A1* | 10/2012 | Strecker | ................ | B62D 5/0466 701/41 |
| 2013/0060427 A1* | 3/2013 | Kataoka | ................ | B62D 6/008 701/42 |
| 2014/0371992 A1* | 12/2014 | Di Cairano | ................ | B62D 6/008 701/41 |
| 2016/0176440 A1* | 6/2016 | Witte | ................ | B62D 6/002 701/23 |
| 2017/0243412 A1* | 8/2017 | Deville | ................ | G06F 11/3013 |
| 2018/0134309 A1* | 5/2018 | Moulaire | ................ | B62D 5/0463 |
| 2018/0286242 A1* | 10/2018 | Talamonti | ................ | B60K 35/60 |
| 2019/0061809 A1* | 2/2019 | Weiefors | ................ | B62D 5/062 |
| 2019/0100241 A1* | 4/2019 | Kudo | ................ | B62D 5/006 |

FOREIGN PATENT DOCUMENTS

| | | | | |
|---|---|---|---|---|
| DE | 10 2014 200 994 A1 | 7/2015 | | |
| FR | 2 948 334 A1 | 1/2011 | | |
| FR | 3037671 A1 * | 12/2016 | ........... | B62D 5/0463 |
| WO | WO-2011010058 A1 * | 1/2011 | ............. | B62D 6/008 |
| WO | WO-2014054625 A1 * | 4/2014 | ........... | B62D 15/025 |

OTHER PUBLICATIONS

G. Cui, B. Li, S. Li, R. Sheng, J. Dou and Z. Yu, "Speed Interval Division of Electric Power Steering Assist Characteristics," 2017 4th International Conference on Information Science and Control Engineering (ICISCE), Changsha, China, 2017, pp. 1243-1247 (Year: 2017).*

A. Marouf, M. Djemai, C. Sentouh and P. Pudlo, "A New Control Strategy of an Electric-Power-Assisted Steering System," in IEEE Transactions on Vehicular Technology, vol. 61, No. 8, pp. 3574-3589, Oct. 2012 (Year: 2012).*

Jan. 3, 2020 Search Report issued in International Patent Application No. PCT/FR2019/051945.

Jan. 3, 2020 Written Opinion of the International Searching Authority issued in International Patent Application No. PCT/FR2019/051945.

* cited by examiner

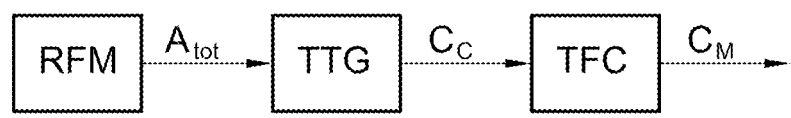
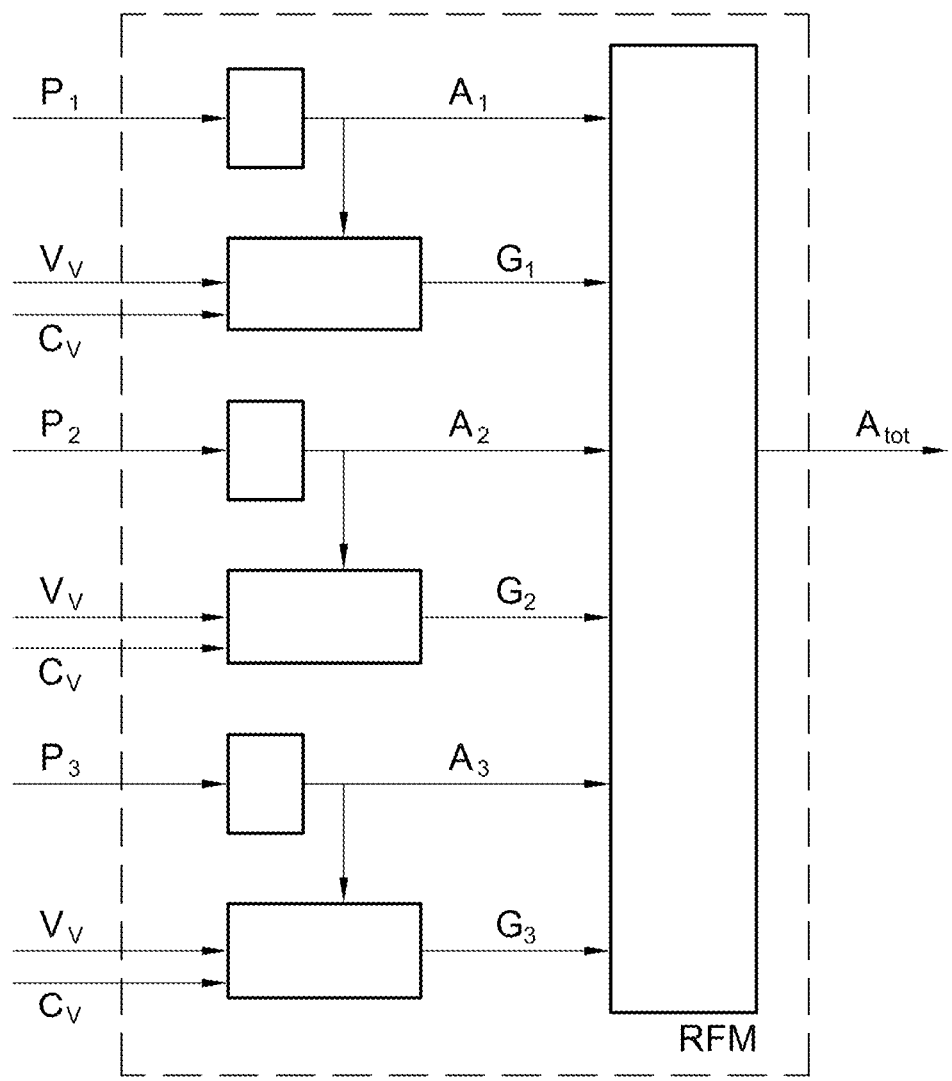

METHOD FOR DETERMINING A SETPOINT TORQUE FOR A STEERING WHEEL AS A FUNCTION OF A GAIN DEPENDENT ON A STEERING WHEEL TORQUE

The invention concerns the field of electric power steering systems and more particularly a method for determining a setpoint torque for a steering wheel.

The purpose of a vehicle steering system is to allow a driver to control a trajectory of the vehicle. The trajectory is described by a set of successive positions occupied by a vehicle over time. The vehicle trajectory is a curve dependent on a set of parameters, which can be measured or calculated. Said parameters vary depending on a state of the forces being applied on the vehicle so as to produce a movement. The state of the forces will be referred to hereinafter as the dynamic situation of the vehicle. The parameters are, for example, a longitudinal speed of the vehicle, a lateral acceleration of the vehicle, a yaw rate of the vehicle, a yaw acceleration of the vehicle, a force exerted on the wheels, a steering wheel angle, a speed of rotation of the steering wheel, etc. . . .

By changing an angle of orientation of the vehicle's wheels, the driver acts on a parameter of the dynamic situation of the vehicle so as to change the trajectory of the vehicle. The angle of orientation of the wheels is in particular linked to an angle of a steering wheel, hereinafter referred to as «steering wheel angle». The driver changes the steering wheel angle by exerting a force on the steering wheel, hereinafter called «steering wheel torque».

In order for the driver to control the trajectory of the vehicle, it is important that he can feel, through the steering wheel of the steering system, the dynamic situation of the vehicle.

Generally, a steering system comprises several elements including said steering wheel, a rack, and two wheels each connected to a tie rod. The rack is the part allowing maneuvering the wheels, that is to say, allowing changing the angle of orientation of the wheels, via the tie rods. The rack transforms a variation in the steering wheel angle into a variation in the rotation of the vehicle's wheels.

An electric power steering system comprises a computer which determines in particular a torque to be felt by the driver when maneuvering the steering wheel, hereinafter referred to as setpoint torque. The computer servo-controls the steering wheel torque to the setpoint torque. In doing so, the computer changes the feeling of the dynamic situation of the vehicle by the driver. According to the dynamic situation of the vehicle, the setpoint torque will vary and the driver will be able to turn the steering wheel more or less easily. For example, when the dynamic situation of the vehicle corresponds to a parking situation, that is to say a situation in which the vehicle performs a trajectory at low speed, the driver will be able to turn the steering wheel more easily than when the vehicle performs a trajectory at high speed, typically greater than 50 km/h.

The servo-control of steering wheel torque to the setpoint torque is carried out by a control motor. The control motor exerts a motor torque so that the steering wheel torque is equal to the setpoint torque.

In a mechanical-type electric power steering system, there is a mechanical link, generally carried out by a steering column, between the steering wheel and the rack. The control motor then exerts the motor torque indirectly on the steering wheel, by exerting the motor torque on the rack or on the steering column.

In a «steer-by-wire» type electric power steering system, the steering wheel angle is measured or calculated so that a maneuvering motor changes the orientation of the vehicle's wheels via the rack. The control motor then exerts the motor torque directly on the steering wheel so as in particular to make the driver aware of an inertia of the rack, that is to say a weight of the rack. The «steer-by-wire» type electric power steering system therefore comprises two motors, one, the maneuvering motor, actuates the rack, the other, the control motor, exerts a counter torque to the steering wheel torque.

One manner of determining the setpoint torque is described in the patent FR2948334. More specifically, the setpoint torque is determined as a function of a virtual magnitude, that is to say a magnitude which is not corresponding to a physical parameter, called «equivalent lateral acceleration», having a dimension of an acceleration ($L \cdot T^2$). The equivalent lateral acceleration is calculated from at least one force being exerted on the rack, that is to say a force representative of the force being exerted on the wheels. The equivalent lateral acceleration, thus calculated, is weighted by a gain which depends on the equivalent lateral acceleration itself.

This determination of the equivalent lateral acceleration does not allow distinguishing the dynamic situation in which the driver holds or does not hold the steering wheel, that is to say a situation in which the driver exerts, or does not exert, a force on the steering wheel. Such a dynamic situation is encountered, for example, at the exit of a roundabout, the driver holds the steering wheel so as to turn then he lets go of the steering wheel so that the steering wheel «naturally» returns to the center, that is to say at a steering wheel angle at which the vehicle performs a straight-line trajectory.

The invention aims at overcoming all or part of the aforementioned drawback by proposing a method for determining a setpoint torque for a steering wheel of an electric power steering system of a vehicle, said setpoint torque allowing determining a motor torque which is applied directly or indirectly on the steering wheel, said setpoint torque being a function of at least one equivalent lateral acceleration having a dimension of an acceleration, characterized in that said equivalent lateral acceleration is weighted by a gain dependent on at least one steering wheel torque.

The weighting of the equivalent lateral acceleration by a gain dependent on at least the steering wheel torque allows varying an influence of the equivalent lateral acceleration in determining the setpoint torque. By way of example, one can select one or more ranges of value of the steering wheel torque for which the equivalent lateral acceleration will be zero. For this, it is sufficient that the gain is equal to 0 on said ranges. Conversely, when one wants to favor the equivalent lateral acceleration, one increases the value of the gain.

The gain is a dimensionless magnitude which is predetermined at the design stage or determined by learning depending on the dynamic situations encountered by the vehicle.

In general, the weighting of the equivalent lateral acceleration by a gain dependent on at least one steering wheel torque allows differentiating the dynamic situation of the vehicle in which a driver holds the steering wheel, that is to say when the steering torque is different from 0, from a dynamic situation in which the driver lets go of the steering wheel, that is to say when the steering wheel torque is equal to 0.

In doing so, the influence of the equivalent lateral acceleration in determining the setpoint torque is easily modifiable depending on the dynamic situation of the vehicle.

Furthermore, an edge effect between the dynamic situation in which the steering wheel is held and then released is suppressed by continuously varying the gain.

According to one feature of the invention, the gain depends on a vehicle longitudinal speed.

Varying the weighting gain of the equivalent lateral acceleration as a function of the longitudinal vehicle speed allows differentiating the dynamic situation of the vehicle in which the vehicle performs a movement at high speed and the dynamic situation of the vehicle in which the vehicle is running so as to perform parking maneuvers at low speed.

According to one feature of the invention, the gain varies between 0 and 1.

In this manner, it is possible to take into account, in determining the setpoint torque, the influence of the equivalent lateral acceleration when the gain is equal to 1 or, on the contrary, to ignore it when the gain has a value of 0.

According to one feature of the invention, the equivalent lateral acceleration depends on a parameter varying depending on a dynamic situation of the vehicle.

Thus, the equivalent lateral acceleration is representative of the selected parameter and varies depending on the dynamic situation of the vehicle.

According to one feature of the invention, the parameter is selected from a yaw rate of the vehicle, a yaw acceleration of the vehicle, a lateral acceleration of the vehicle, a steering wheel angle, a force being exerted on a rack, said force being measured by means of a sensor which is positioned on the rack, an estimated force being exerted on the rack, said estimated force comprising an estimate of the friction being exerted on the electric power steering system, a desired force being exerted on the rack.

The yaw rate represents the speed of rotation of the vehicle about a vertical axis, that is to say, an axis transverse to a plane in which the vehicle performs a trajectory.

The yaw acceleration represents the rotational acceleration of the vehicle about the vertical axis.

The lateral acceleration of the vehicle represents the acceleration of the vehicle in a lateral direction, that is to say, a direction transverse to an axis of elongation of the vehicle.

The force being exerted on the rack is measured by means of a sensor positioned on the rack. Said sensor may be a sensor called «strain gauge» sensor positioned on a tie rod of the power steering system. This sensor allows a measurement, and not an estimate via a mathematical model, of the force being applied on the rack.

The estimated force being exerted on the rack is the representation of the force being exerted on the rack to which friction, being exerted on the steering system, has been added The desired force being exerted on the rack is the rack force which is calculated by an estimator, said estimator possibly being a mathematical model representing a simplified mechanical model, or the force requested from the control motor, that is to say the setpoint torque, which is not necessarily applied because of the performance limitations of the control motor.

According to one feature of the invention, the setpoint torque is a function of a total equivalent lateral acceleration dependent on a plurality of equivalent lateral accelerations.

Each equivalent lateral acceleration depends on a parameter varying depending on a dynamic situation of the vehicle.

Each equivalent lateral acceleration is weighted by a gain which is specific thereto.

Each equivalent lateral acceleration allows taking into account the influence of a parameter of the dynamic situation of the vehicle. Thus, the total equivalent lateral acceleration allows taking into account a plurality of parameters of the dynamic situation of the vehicle through the plurality of equivalent lateral accelerations.

In this manner, the setpoint torque which is determined from the total equivalent lateral acceleration takes into account a plurality of parameters of the dynamic situation of the vehicle. The setpoint torque thus improves the driver's perception of the dynamic situation of the vehicle.

According to one feature of the invention, the total equivalent lateral acceleration is calculated by a weighted average of the plurality of the equivalent lateral accelerations.

The weighted average is calculated by the formula:

$$A_{tot} = \frac{\sum A_i \cdot G_i}{G_i}$$

With $A_{tot}$: the total equivalent acceleration, $A_i$: the equivalent lateral acceleration of the parameter i, $G_i$: the gain of the equivalent lateral acceleration of the parameter i. The number of parameter i being able to vary from 1 to 100. Preferably, i is equal to 3.

The invention will be better understood, thanks to the following description, which relates to an embodiment according to the present invention, given by way of non-limiting example and explained with reference to the appended schematic drawings, in which:

FIG. 1 is a logic diagram of an algorithm allowing determining a motor torque;

FIG. 2 is a more accurate logic diagram of a portion of the algorithm according to FIG. 1;

FIG. 3 illustrates a determination of an equivalent lateral acceleration $A_1$ of a first parameter P1 and of the first gain G1 of said equivalent lateral acceleration $A_1$ of the parameter P1.

Figure 3:
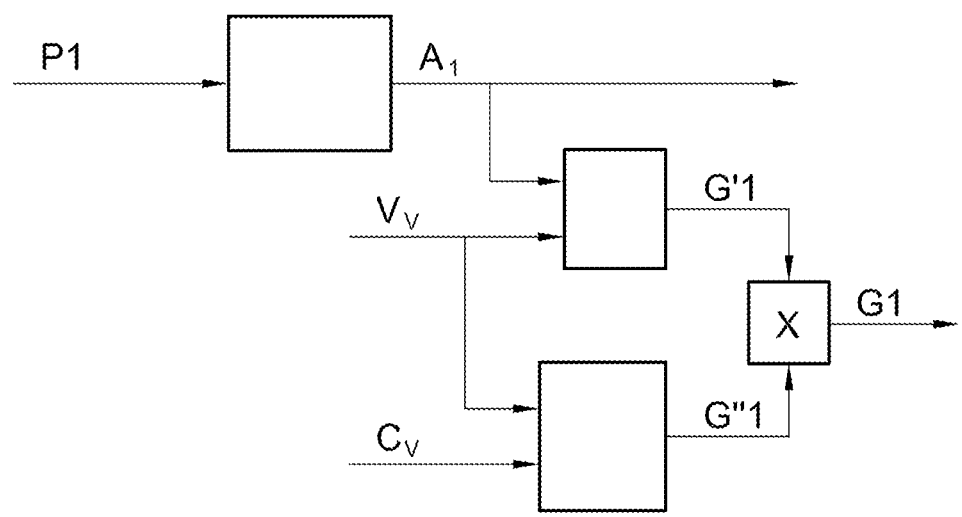
FIG. 3 is a more accurate logic diagram of a portion of the algorithm according to FIG. 2.

The first parameter P1 is representative of a trajectory of a vehicle, that is to say, of a dynamic situation of the vehicle. In the example represented in FIG. 3, the first parameter P1 is representative of a steering wheel angle of a steering wheel of a power steering system of the vehicle.

From the first parameter P1, the equivalent lateral acceleration Ai having a dimension of an acceleration $(L \cdot T^{-2})$ is determined, in a manner known to those skilled in the art.

From the equivalent lateral acceleration $A_1$, and a longitudinal speed $V_V$ of the vehicle, a first portion G'1 of the first gain G1 is determined.

From the longitudinal speed $V_V$ of the vehicle and a steering wheel torque $C_V$ exerted by a driver on the steering wheel, a second portion G"1 of the first gain $G_1$ is determined.

The first portion G'1 and the second portion G"1 are then multiplied so as to obtain the first gain $G_1$ which is a dimensionless magnitude specific to the first parameter P1. The first gain $G_1$ is represented by a three-dimensional graph. The first gain $G_1$ varies between 0 and 1.

Thus, by using the steering wheel torque $C_V$, the first gain $G_1$ allows differentiating a dynamic situation of the vehicle in which the driver holds the steering wheel and a dynamic situation in which the driver does not hold the steering wheel.

Furthermore, by using the longitudinal speed $V_V$ of the vehicle, the first gain $G_1$ allows differentiating a dynamic situation of the vehicle in which the vehicle is running so as to make a journey between a starting point and an arrival point, and a dynamic situation in which the vehicle performs parking maneuvers.

FIG. 2 illustrates the determination of a total equivalent lateral acceleration $A_{tot}$ from 3 parameters P1, P2, P3.

The first parameter P1 is identical to the first parameter P1 described in FIG. 3.

A second parameter P2 is representative of the trajectory of the vehicle. In the example represented in FIG. 2, the second parameter P2 is representative of a force exerted on wheels of the vehicle, that is to say a force being exerted on a rack of the power steering system of the vehicle.

From the second parameter P2, the equivalent lateral acceleration $A_2$ is determined, in a manner known to those skilled in the art.

From the equivalent lateral acceleration $A_2$, the longitudinal speed $V_V$ of the vehicle and the steering torque $C_V$ exerted by the driver on the steering wheel, a second gain $G_2$ is determined in the same manner as the first gain $G_1$ was determined. Thus the second gain $G_2$ is a magnitude represented by a dimensionless three-dimensional graph varying between 0 and 1.

A third parameter P3 is representative of the trajectory of the vehicle. In the example represented in FIG. 2, the third parameter P3 is representative of a yaw rate of the vehicle, that is to say the speed of rotation of the vehicle about an axis normal to a plane in which the vehicle circulates.

From the third parameter P3, the equivalent lateral acceleration $A_3$ is determined, in a manner known to those skilled in the art.

From the equivalent lateral acceleration $A_3$, the longitudinal speed $V_V$ of the vehicle and the steering wheel torque $C_V$ exerted by a driver on the steering wheel, a third gain $G_3$ is determined in the same manner as the first gain G1 was determined. Thus the third gain G3 is a magnitude represented by a dimensionless three-dimensional graph varying between 0 and 1.

A total equivalent lateral acceleration $A_{tot}$ is then determined by carrying out a weighted average of the equivalent lateral accelerations of the 3 parameters according to the formula:

$$A_{tot} = \frac{\sum_{i=1}^{3} A_i \cdot G_i}{\sum_{i=3}^{3} G_i}$$

The total equivalent lateral acceleration $A_{tot}$ could also be determined from, for example, a yaw acceleration, that is to say, the acceleration of the rotation of the vehicle about the axis normal to the plane in which the vehicle circulates, or a deviation in the speed of rotation of the vehicle's wheels.

Thus the total equivalent lateral acceleration $A_{tot}$ does not represent a physical magnitude of the vehicle but the total equivalent lateral acceleration $A_{tot}$ is representative of a plurality of parameters representative of the trajectory of the vehicle.

The total equivalent lateral acceleration $A_{tot}$ is determined during a step of RFM construction of the total equivalent lateral acceleration $A_{tot}$.

FIG. 1 represents a simplified logic diagram of an algorithm allowing determining a motor torque $C_M$. Said motor torque $C_M$ is applied by a control motor of a power steering system of a vehicle directly or indirectly on a steering wheel.

More specifically, the algorithm includes the step of RFM construction of the total equivalent lateral acceleration $A_{tot}$ as depicted in FIGS. 2 and 3.

The algorithm also includes a step of TTG development of a setpoint torque $C_c$. The TTG development step receives as input a plurality of parameters dependent on the dynamic situation of the vehicle. These parameters are measured or calculated by a vehicle computer. The development step also receives a total equivalent lateral acceleration $A_{tot}$ which is determined by the RFM construction step.

The setpoint torque $C_c$ is the steering torque desired to be felt by a driver when he turns the steering wheel. Thus it is desired that the steering wheel torque $C_V$ is equal to the setpoint torque $C_c$. The setpoint torque $C_c$ is determined to allow, for example, facilitating or conversely preventing a rotation of the steering wheel by the driver.

In order for the driver to feel the setpoint torque $C_c$, the steering wheel torque $C_V$ is servo-controlled to the setpoint torque $C_c$ during a TFC servo-control step.

During the TFC servo-control step, the motor torque $C_M$ applied by the control motor directly or indirectly on the steering wheel is determined in order to obtain an equality between the setpoint torque $C_c$ and the steering wheel torque $C_V$.

Thus, the purpose of the control motor is to servo-control a steering wheel torque $C_V$, exerted by a driver on the steering wheel, to a setpoint torque $C_c$. In this manner, a feeling of a dynamic situation of the vehicle by the driver is promoted.

Of course, the invention is not limited to the embodiments described and represented in the appended figures. Changes remain possible, in particular from the point of view of the constitution of the various elements or by substitution of technical equivalents, without thereby departing from the scope of protection of the invention.

The invention claimed is:

1. A method for determining a motor torque, comprising:
    determining a setpoint torque for a steering wheel of an electric power steering system, said setpoint torque being a function of at least one equivalent lateral acceleration having a dimension of an acceleration, wherein the equivalent lateral acceleration is weighted by a gain dependent on at least one steering wheel torque and on a vehicle longitudinal speed,
    determining the motor torque based on the setpoint torque; and
    applying the motor torque directly or indirectly on the steering wheel.

2. The determination method according to claim 1, wherein the gain varies between 0 and 1.

3. The determination method according to claim 1, wherein the equivalent lateral acceleration depends on a parameter varying depending on a dynamic situation of the vehicle.

4. The determination method according to claim 3, wherein the parameter is selected from a yaw rate of the vehicle, a yaw acceleration of the vehicle, a lateral acceleration of the vehicle, a steering wheel angle, a force being exerted on a rack, the force being measured by means of a sensor which is positioned on the rack, an estimated force being exerted on the rack, the estimated force comprising an estimate of the friction being exerted on the electric power steering system, or a desired force being exerted on the rack.

5. The determination method according to claim 1, wherein the setpoint torque is a function of a total equivalent lateral acceleration dependent on a plurality of equivalent lateral accelerations.

6. The determination method according to claim 3, wherein the total equivalent lateral acceleration is calculated by a weighted average of the plurality of the equivalent lateral accelerations.

* * * * *